(12) United States Patent
Bush (10) Patent No.: US 11,619,067 B2
(45) Date of Patent: Apr. 4, 2023

(54) AIRCRAFT DOOR LOCK AND METHOD

(71) Applicant: BOMBARDIER INC., Dorval (CA)

(72) Inventor: Duncan Bush, Mississauga (CA)

(73) Assignee: BOMBARDIER INC., Dorval (CA)

(*) Notice: Subject to any disclaimer, the term of this patent is extended or adjusted under 35 U.S.C. 154(b) by 314 days.

(21) Appl. No.: 16/758,446

(22) PCT Filed: Oct. 24, 2018

(86) PCT No.: PCT/CA2018/051347
§ 371 (c)(1),
(2) Date: Apr. 23, 2020

(87) PCT Pub. No.: WO2019/079897
PCT Pub. Date: May 2, 2019

(65) Prior Publication Data
US 2020/0255115 A1    Aug. 13, 2020

Related U.S. Application Data (60) Provisional application No. 62/576,816, filed on Oct. 25, 2017.

(51) Int. Cl.
*E05B 9/04* (2006.01)
*E05B 17/04* (2006.01)
(Continued)

(52) U.S. Cl.
CPC .............. *E05B 17/002* (2013.01); *E05B 9/04* (2013.01); *E05B 15/08* (2013.01); *E05B 17/047* (2013.01); *E05B 65/001* (2013.01); *B64C 1/1407* (2013.01)

(58) Field of Classification Search
CPC . E05B 9/04; E05B 15/08; E05B 15/10; E05B 17/04; E05B 17/047; E05B 57/00;
(Continued)

(56) References Cited

U.S. PATENT DOCUMENTS 2,255,402 A  *  9/1941  Vile .................... E05B 63/0013
                                                        70/380
2,396,006 A       3/1946  Gross et al.
(Continued)

FOREIGN PATENT DOCUMENTS

DE        10357995        7/2005
GB         2458988       10/2009

OTHER PUBLICATIONS

International Search Report and Written Opinion, PCT/CA2018/051347, dated Jan. 8, 2019.
(Continued)

*Primary Examiner* — Christopher J Boswell
(74) *Attorney, Agent, or Firm* — Norton Rose Fulbright Canada LLP (57) ABSTRACT

A lock for an aircraft door. The lock includes an outer shell having an inner cavity. A core is rotatably mounted within the inner cavity to rotate about an axis of the core. The core has a keyhole extending through the core from a first end of the core for receiving a key therein, to an opposed second end of the core. The keyhole defines an air leakage path through the core. A cam has a cam arm mounted about the core and is rotatable therewith. The second end of the core protrudes from the cam. A cover is attached to the second end of the core. The cover blocks the keyhole at the second end of the core and obstructing the air leakage path. An aircraft door, methods, and a retrofit kit are also disclosed.

20 Claims, 6 Drawing Sheets

(51) Int. Cl.
  *E05B 65/00* (2006.01)
  *E05B 17/00* (2006.01)
  *E05B 15/08* (2006.01)
  *B64C 1/14* (2006.01)

(58) Field of Classification Search
  CPC ...... E05B 65/001; E05B 17/002; E05B 17/14; B64C 1/1407
  See application file for complete search history.

(56) References Cited

U.S. PATENT DOCUMENTS

| | | | |
|---|---|---|---|
| 3,094,017 A | | 6/1963 | Champoux et al. |
| 5,685,184 A | * | 11/1997 | Gallagher ............... E05B 17/04 70/358 |
| 6,209,369 B1 | * | 4/2001 | Freck .................... E05B 17/002 70/427 |
| 8,347,677 B2 | * | 1/2013 | Flandrinck .............. E05B 17/04 70/380 |
| 8,756,964 B2 | * | 6/2014 | Yano ....................... E05B 17/04 70/264 |
| 9,273,487 B2 | * | 3/2016 | Irwin ...................... E05B 17/04 |
| 2011/0049299 A1 | | 3/2011 | Gowing et al. |
| 2012/0000256 A1 | * | 1/2012 | Stuckey ............... E05B 35/008 70/91 |
| 2017/0058560 A1 | * | 3/2017 | Lin ........................ E05B 17/04 |

OTHER PUBLICATIONS

Locks provided by Aircraft Security, LLC, part No. AS52129SQUT, https://aircraftsecurity.com/collections/bombardier.

* cited by examiner

AIRCRAFT DOOR LOCK AND METHOD

CROSS-REFERENCE TO RELATED APPLICATIONS

This application is a national phase entry of PCT/CA2018/051347 filed Oct. 24, 2018 which claims priority to U.S. provisional patent application No. 62/576,816 filed on Oct. 25, 2017, the entire contents of each of which are incorporated by reference herein.

TECHNICAL FIELD

The application relates generally to locks and, more particularly, to a lock for an aircraft door.

BACKGROUND

Locks installed on some doors allow air leakage through the lock when the door is in a pressurized zone of an aircraft. Not using locks on the affected doors may increase security risks. Allowing the air leakage through the locks may affect the air pressurization system and/or cause wear on the locks. Installing a pressure box over the problematic locks may incur a weight penalty and increase the difficulty of using the lock.

SUMMARY

In one aspect, there is provided a lock for an aircraft door, the lock comprising: an outer shell having an inner cavity; a core rotatably mounted within the inner cavity to rotate about an axis of the core, the core having a keyhole extending through the core from a first end of the core for receiving a key therein, to an opposed second end of the core, the keyhole defining an air leakage path through the core; a cam having a cam arm mounted about the core and rotatable therewith, the second end of the core protruding from the cam; and a cover attached to the second end of the core, the cover blocking the keyhole at the second end of the core and obstructing the air leakage path.

In an embodiment, the cover includes a cap having a tubular body extending between a first open end and a second closed end, the second end of the core being disposed in the cap and the tubular body encasing the keyhole to obstruct the air leakage path.

In an embodiment, the lock further comprises a washer mounted about the outer surface of the core between the cam and the cover, the washer abutting the cam.

In an embodiment, the cam includes a cap body, the arm extending from the cap body, the cap body having a mounting slot and surrounding an axial portion of an outer surface of the outer shell, the core extending through the mounting slot to mount the cap body to the core.

In an embodiment, the lock further comprises a seal nut mounted about the outer surface of the outer shell, the seal nut having a peripheral groove in an outer surface thereof and a resilient body disposed in the groove, the cap body being mounted about the seal nut, a peripheral wall of the cap body sealingly engaging the resilient body.

In an embodiment, the lock further comprises a resilient seal washer mounted about the outer surface of the outer shell, and two nuts mounted about the outer surface of the outer shell on opposite sides of the seal washer and engaging the seal washer, the seal washer sealingly engaging the outer surface of the outer shell and the cap body.

In another aspect, there is provided an aircraft door, comprising: a door body having a lock hole; and a lock, comprising: an outer shell having an inner cavity, the outer shell mounted within the lock hole; a core rotatably mounted within the inner cavity to rotate about an axis of the core, the core having a keyhole extending through the core from a first end of the core for receiving a key therein, to an opposed second end of the core, the keyhole defining an air leakage path through the core; a cam having a cam arm mounted about the core and rotatable therewith, the second end of the core protruding from the cam; and a cover attached to the second end of the core, the cover blocking the keyhole at the second end of the core and obstructing the air leakage path.

In an embodiment, the cover includes a cap having a tubular body extending between a first open end and a second closed end, the second end of the core being disposed in the cap and the tubular body encasing the keyhole to obstruct the air leakage path.

In an embodiment, the aircraft door further comprises a washer mounted about the outer surface of the core between the cam and the cover, the washer abutting the cam.

In an embodiment, the cam includes a cap body, the cam arm extending from the cap body, the cap body having a mounting slot and surrounding an axial portion of an outer surface of the outer shell, the core extending through the mounting slot to mount the cap body to the core.

In an embodiment, the aircraft door further comprises a seal nut mounted about the outer surface of the outer shell, the seal nut having a peripheral groove in an outer surface thereof and a resilient body disposed in the groove, the cap body being mounted about the seal nut, a peripheral wall of the cap body sealingly engaging the resilient body.

In an embodiment, the aircraft door further comprises a resilient seal washer mounted about the outer surface of the outer shell, and two nuts mounted about the outer surface of the outer shell on opposite sides of the seal washer and engaging the seal washer, the seal washer sealingly engaging the outer surface of the outer shell and the cap body.

In yet another aspect, there is provided an aircraft, comprising: a wall defining a first zone on a first side of the wall and a second zone on a second side of the wall, the first zone configured to have a first pressure and the second zone configured to have a second pressure different from the first pressure, and the aircraft door as disclosed herein, the aircraft door disposed in the wall and openable to provide access between the first and second zones.

In yet another aspect, there is provided a method of reducing air leakage through a lock for an aircraft door disposed between a first zone having a first pressure and a second zone having a second pressure different than the first pressure, the method comprising: providing the lock with an outer shell having a rotatable core therein, the core having a keyhole extending through the core from a first end of the core for receiving a key therein, to an opposed second end of the core, the keyhole being in fluid communication with the first and second zones, an air leakage path defined along the keyhole; and blocking the keyhole at the second end of the core to obstruct the air leakage path.

In an embodiment, blocking the keyhole includes enclosing the second end of the core.

In an embodiment, the method further comprises sealingly engaging a cam to an outer surface of the outer shell.

In an embodiment, sealingly engaging the cam includes obstructing a radial distance defined between the cam and the outer surface of the outer shell.

In an embodiment, providing the lock includes replacing an arm of a cam of the lock.

In yet another aspect, there is provided a method of retrofitting a lock for an aircraft door disposed between a first zone having a first pressure and a second zone having a second pressure different than the first pressure, the lock including an outer shell, a core rotatable within the outer shell and having a keyhole slot extending therethrough, and a cam extending from and connected to the core, the method comprising: disconnecting the cam from the core and removing the cam; sealingly engaging a seal member around the outer shell; connecting a replacement cam with the core by inserting the core through a mounting slot of a cap body; surrounding part of the outer shell with the cap body and sealingly engaging the cap body with the seal member; and engaging a cover with an end of the core protruding from the replacement cam to block the keyhole at the end and obstruct an air leakage path defined through the keyhole.

In yet another aspect, there is provided a retrofit kit for reducing air leakage through a lock for an aircraft door, the lock including an outer shell, a core rotatable within the outer shell and having a keyhole slot extending therethrough, and a cam extending from and connected to the core, the kit comprising: a seal member sealingly engageable around the outer shell; a replacement cam including a cap body having a mounting slot defined therethrough for engaging the core, the cap body sealingly engageable with the seal member, the replacement cam substitutable with the cam; a cover sealingly engageable with an end of the core protruding from the cam to block the keyhole at the end and obstruct an air leakage path defined through the keyhole.

DESCRIPTION OF THE DRAWINGS

Reference is now made to the accompanying figures in which.

DETAILED DESCRIPTION

Figure 1:
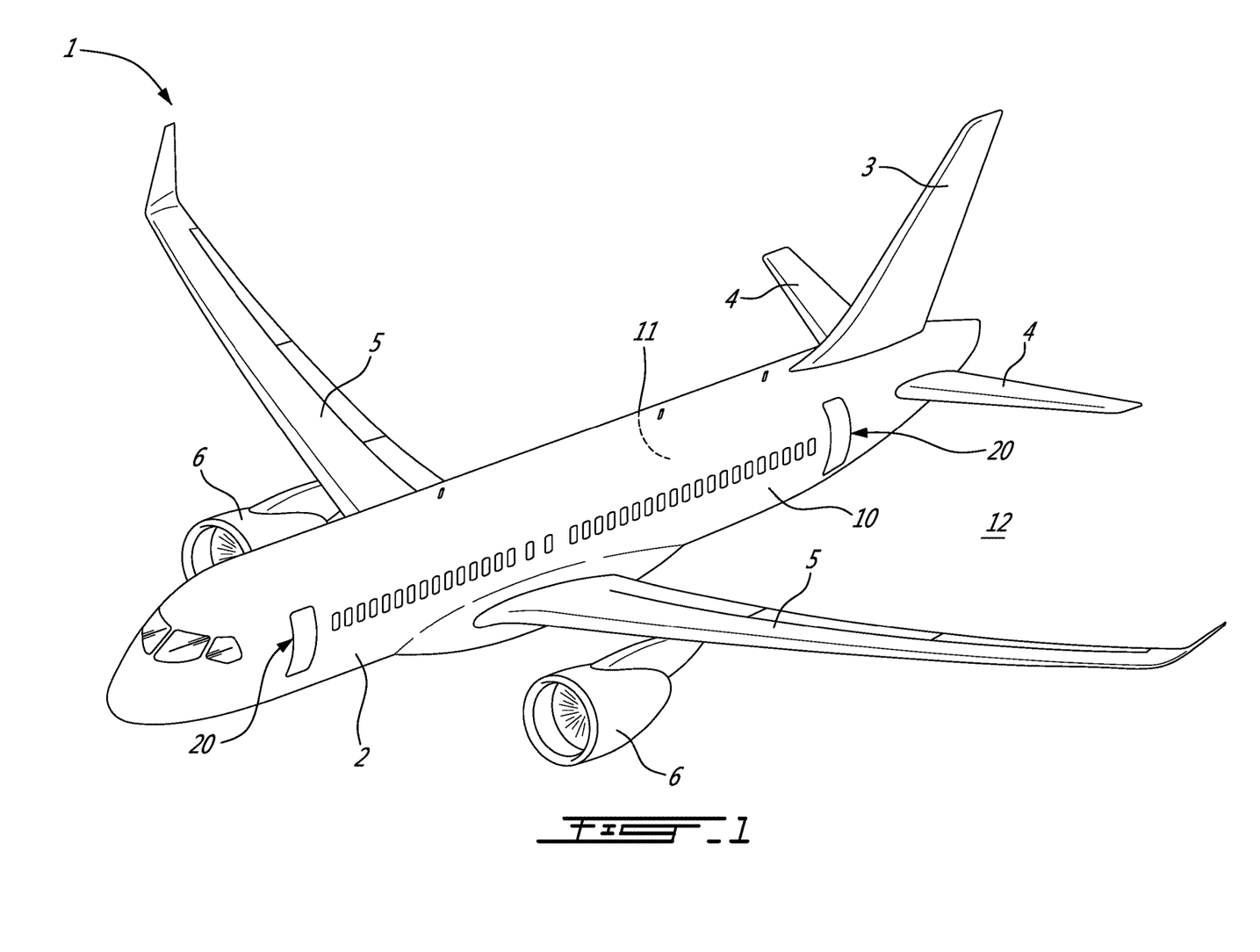
FIG. 1 is a schematic tridimensional view of an aircraft, according to an embodiment of the present disclosure.

FIG. 1 illustrates an aircraft 1. Some of the components of the aircraft 1 are shown and described herein. The aircraft 1 has a fuselage 2 having a fore end at which a cockpit is located, and an aft end supporting a tail assembly, with the cabin generally located between the cockpit and the tail assembly. The tail assembly includes a vertical stabilizer 3 with a rudder, and horizontal stabilizers 4 with elevators. The tail assembly has a fuselage-mounted tail, but other configurations may also be used for the aircraft 1, such as cruciform, T-tail, etc. Wings 5 project laterally from the fuselage 2. The aircraft 1 has engines 6 supported by the wings 5, although the engines 6 could also be mounted to the fuselage 2. The aircraft 1 is shown as a jet-engine aircraft, but may also be a propeller aircraft.

A wall 10 separates the interior of the aircraft 1 from its exterior environment. The wall 10 therefore defines a first zone 11 on a first side of the wall 10, and a second zone 12 on a second side of the wall 10. In the depicted embodiment, the wall 10 is formed by the fuselage 2, and thus forms a barrier between the first zone 11 within the aircraft 1, and the second zone 12 outside the aircraft 1. When the aircraft 1 is in flight and the cabin is pressurized, the wall 10 forms a pressure wall because there exists a pressure difference across the wall 10. More particularly, the internal first zone 11 will have a first pressure associated with the pressure of the cabin, and the external second zone 12 will have a lower pressure associated with the pressure of the environment surrounding the aircraft 1. The wall 10 therefore is configured to separate a pressurized region from an under pressurized or non-pressurized region. The pressure differential across the wall 10 may cause air leakage through the wall 10 from the region of greater pressure, as described in greater detail below. It will be appreciated that the wall 10 is not limited to being part of the fuselage 2, or to being an external wall of the aircraft 1. In an alternate embodiment, the wall 10 is an internal partition of the aircraft 1 that divides first and second internal zones 11,12 that have different pressures.

Still referring to FIG. 1, multiple doors 20 in the wall 10 form barriers between the first and second zones 11,12, and allow passage into and out of the fuselage 2. Each door 20 can be opened to provide access between the first and second zones 11,12, and can be closed to prevent access between the first and second zones 11,12. When the door 20 is closed, the pressure differential between the first and second zones 11,12 separated by the door 20 may cause air leakage across the door 20 from the region of greater pressure, as described in greater detail below. In the depicted embodiment, the doors 20 are positioned at entry points into the cabin. In an alternate embodiment, the door 20 is a barrier within the internal zone 11 of the cabin. For example, in such an embodiment, the door 20 is a barrier or hatch at the entrance to an internal compartment that contains sensitive or vulnerable equipment.

Figure 5A:
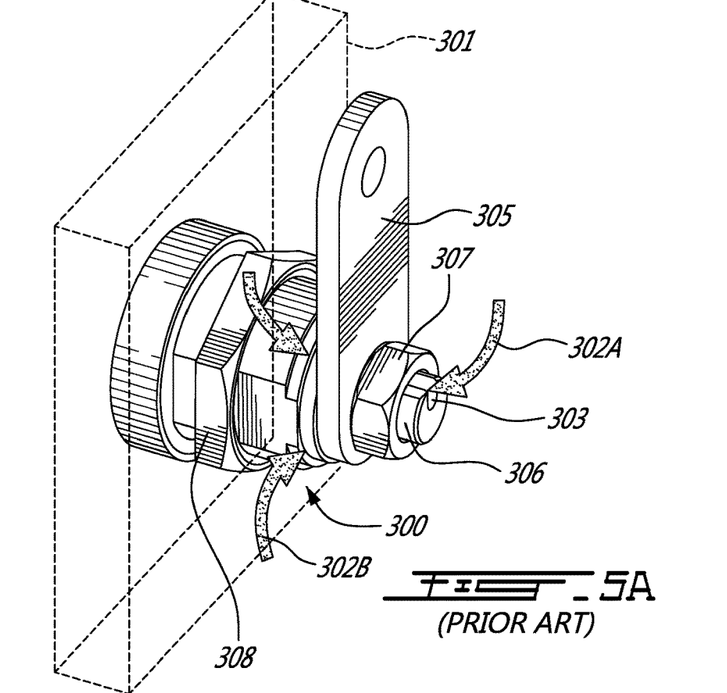
FIGS. 5A and 5B are schematic tridimensional views of a prior art lock for a door.
Figure 5B:
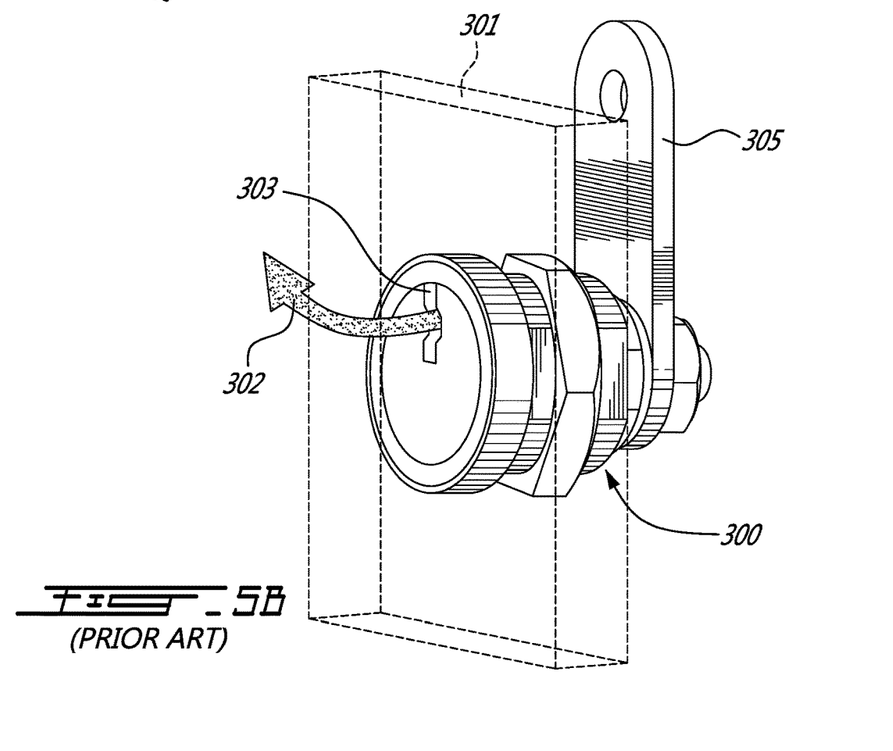

An example of a prior art lock 300 for a door 301 in a pressurized zone is shown in FIGS. 5A and 5B. The lock 300 does not inhibit or resist air leakage, and therefore, air leaks through the lock 300. More particularly, an air leakage path 302 is defined through the keyhole 303 of the lock 300. The air leakage path 302 is fed by two sources. A first source 302A of the air leakage path 302 is defined along and through the keyhole 303. A second source 302B of the air leakage path 302 is defined along the periphery of the core 306 of the lock 300, as the core 306 becomes exposed when subjected to the rotating action of the cam arm 305 of the lock 300. The second source 302B meets up with the first source 302B and the combined airflow exits the keyhole 303 via the front of the lock 300.

Figure 2A:
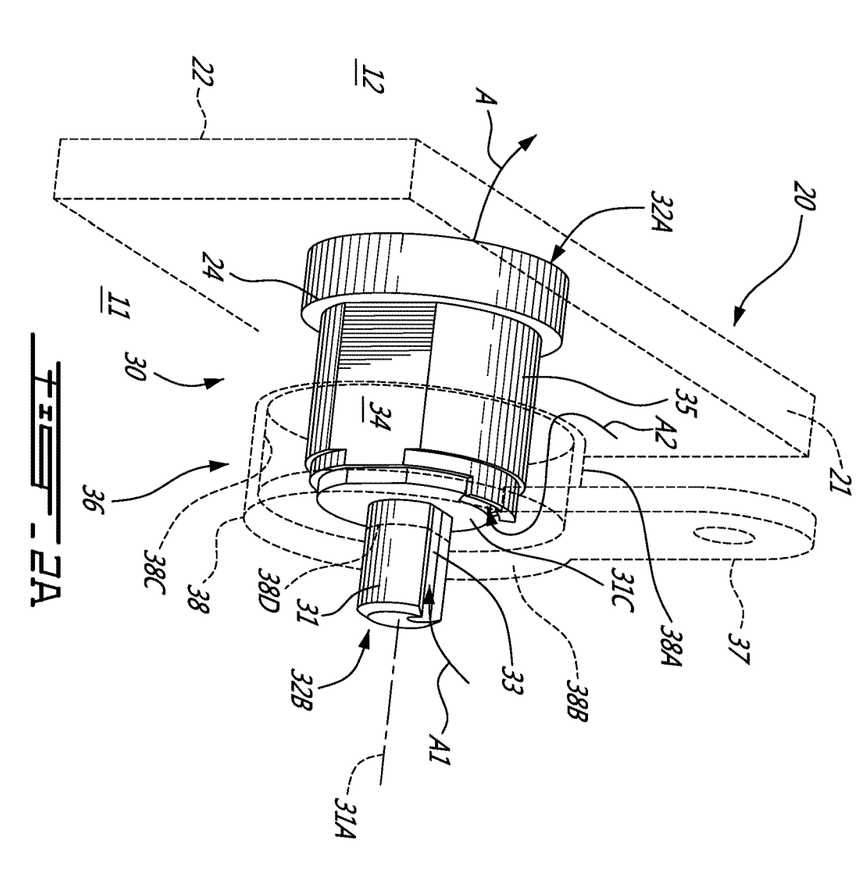
FIG. 2A is a schematic tridimensional view of part of a door and part of a lock of the aircraft of FIG. 1.

Reference is made to FIG. 2A, which shows a segment of the door 20 according to an embodiment of the present disclosure. The door 20 has a door body 21 with an external surface 22. When the door 20 is closed and installed on the aircraft 1, the external surface 22 faces toward the second zone 12, and the inner surface of the door 20 faces toward the first zone 11. The external surface 22 is flush with one of the sides of the wall 10. The door body 21 has a lock hole 24 for receiving a lock 30 therein. The lock hole 24 is an opening in the door body 21 that is shaped and sized to correspond to the lock 30.

The lock 30 is now described in greater detail. In addition to its locking and unlocking functionality, the lock 30 helps to reduce or eliminate air leakage through the lock 30 caused by the pressure difference in the first and second zones 11,12 separated by the door 20. The pressure difference between the first and second zones 11,12 may drive air through the lock 30 along air leakage paths, which are described below. Since the lock 30 helps to reduce or eliminate this air leakage, it can be referred to as a "pressure-resistant" lock 30. Some of the components of the lock 30 are now described, and it will be appreciated that the lock 30 may have other components related to its locking functionality that are not explicitly mentioned herein.

Figure 2B:
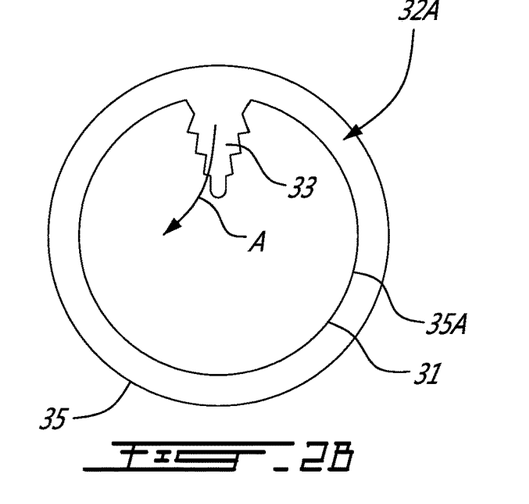
FIG. 2B is a schematic view of a first end of the part of the lock of FIG. 2A.

Referring to FIGS. 2A and 2B, the lock 30 has an inner core 31 which is rotatably mounted within a cavity 35A of an outer shell 35. The core 31 is an elongated body, and extends between a first end 32A and an opposite second end 32B. The first end 32A of the core 31 is accessible by a user of the lock 30, and is the end of the lock 30 at which a key is inserted. The core 31 has a keyhole 33 that extends through the core 31 between the first and second ends 32A,32B. The keyhole 33 is an open-end slot extending into the core 31 from the outer surface of the core 31. The key for the lock 30 is inserted into the keyhole 33 from the first end 32A of the core 31. The keyhole 33 is an opening or passage through the core 31 that has a shape being complementary to that of the key used to lock and unlock the lock 30. The core 31 rotates about a longitudinal axis 31A with respect to the outer shell 35 when a user inserts the key into the keyhole 33 and turns the key. A stop washer 31C is mounted about the core 31 and abuts against the end of the outer shell 35. In the depicted embodiment, the core 31 has a cylindrical cross-sectional shape along some of its length, and a substantially oblong or obround shape along the remainder of the length of the core 31. The core 31 has an oblong cross-sectional shape at its second end 32B. It will be appreciated that the core 31 may have different shapes.

Figure 2C:
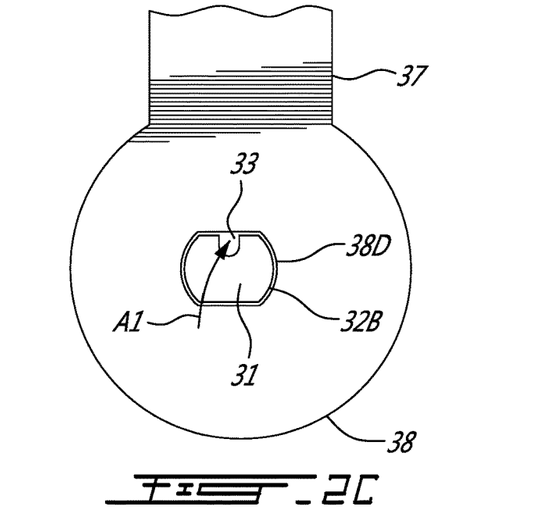
FIG. 2C is a schematic view of a second end of the part of the lock of FIG. 2A.

The lock 30 also has a cam 36. Only part of the cam 36 is shown in FIG. 2A, and the cam 36 in the depicted embodiment is a cap-cam. The cam 36 engages a lock bolt or other mechanism to translate rotation of the key into locking and unlocking the lock 30. The cam 36 has a cam arm 37 mounted about the core 31 and rotatable therewith. Stated differently, rotation of the core 31 also causes the cam arm 37 to rotate about the axis 31A of the core 31. In the depicted embodiment, the cam 36 has a cap body 38. The cam arm 37 extends from the cap body 38. More particularly, the cam arm 37 extends along a radial direction to the longitudinal axis 31A from the cap body 38. The cap body 38 is mounted to the core 31 and spaced radially or laterally from an outer surface 34 of the outer shell 35. The cap body 38 surrounds an axial portion of the outer shell 35. More particularly, the cap body 38 in the depicted embodiment is a cylindrical body, and includes a rounded peripheral wall 38A connected to an end wall 38B. An inner surface 38C of the peripheral wall 38A is spaced from the outer surface 34 of the outer shell 35. The end wall 38B has a mounting slot 38D extending through the end wall 38B. The mounting slot 38D allows the cap body 38 to be mounted over the second end 32B of the core 31. The shape of the mounting slot 38D corresponds to the obround cross-sectional shape of the second end 32B of the core 31 such that there is no relative movement between the core 31 and cap body 38 when the core 31 is rotated (see FIG. 2C). When the cap body 38 is mounted to the core 31, the second end 32B of the core 31 protrudes through the mounting slot 38D and thus from the cam arm 37.

Still referring to FIG. 2A, when the pressure acting against the lock 30 at the first end 32A is different from the pressure acting against the lock 30 at the second end 32B, the pressure differential may cause air to pass through or around the lock 30, and therefore "leak" from one end of the lock 30 to the other. More particularly, it has been observed that a pressure difference causes air to flow along an air leakage path A through the core 31. The keyhole 33 forms an opening through the core 31 and defines the air leakage path A. The air leakage path A has two sources. A first source A1 of the air leakage path A extends along and through the keyhole 33 (see FIG. 2C as well). A second source A2 of the air leakage path A extends between the cam arm 37 and the core 31. More particularly, in the depicted embodiment, the second source A2 of the air leakage path A originates at a gap between the inner surface 38C of the peripheral wall 38A of the cap body 38 and the outer shell 35, and joins the first source A1 at the keyhole 33 by passing through small peripheral gaps between the stop washer 31C and the cavity 35A of the outer shell 35. The peripheral gaps allow the core 31 to freely rotate within the outer shell 35. After the second source A2 meets up with the first source A1, the combined airflow exits the keyhole 33 via the first end 32A of the core 31. On some conventional aircraft door locks, such as shown in FIGS. 5A and 5B, air leakage in the amount of about 1 lbs./min has been observed along the air leakage path A at a pressure delta across the door of about 10 psi. This rate of air leakage may be too high for some aircraft. For example, some aircraft have an air leakage budget for the entire aircraft of only about 8 lbs./min.

Figure 3A:
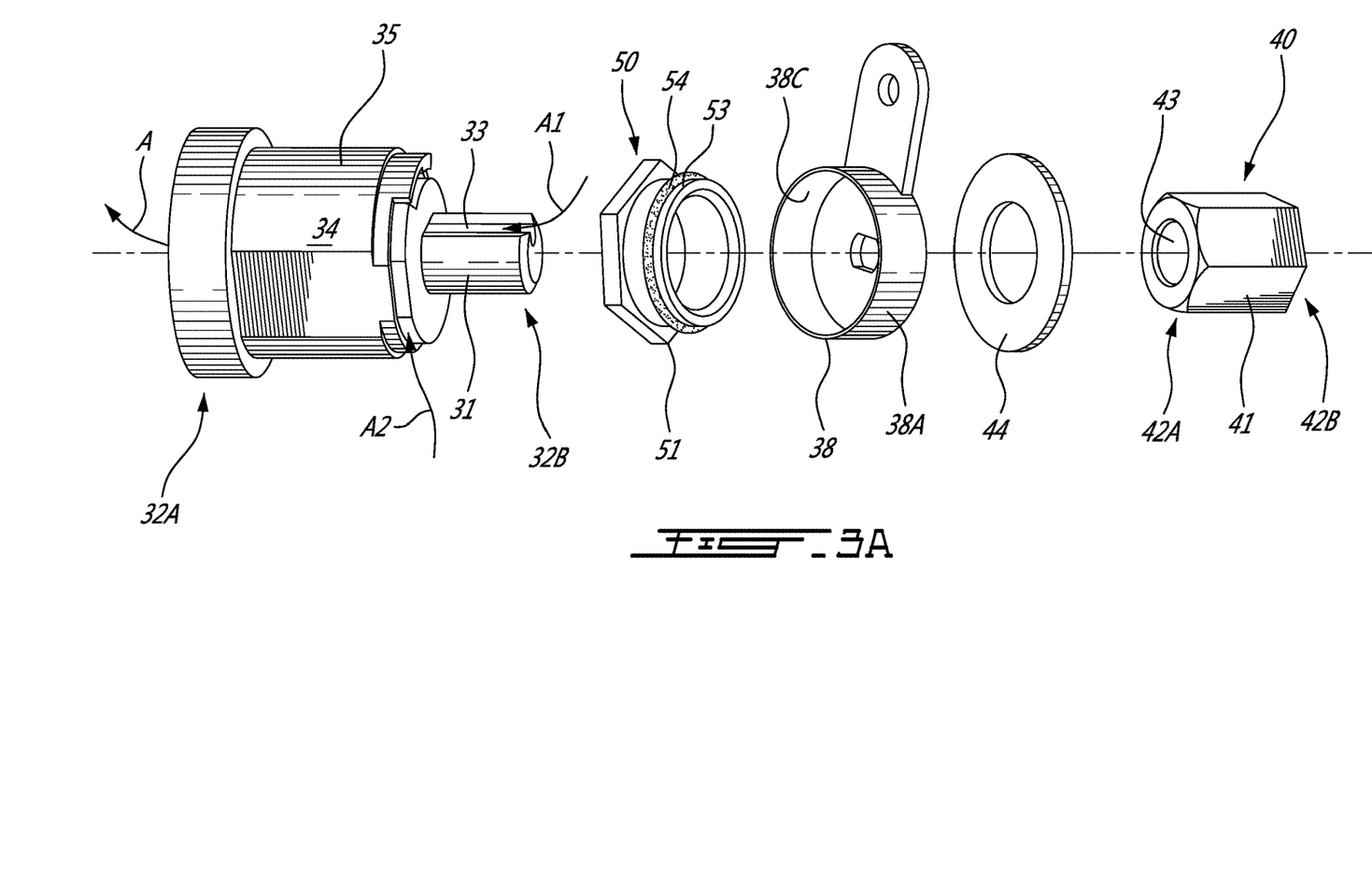
FIG. 3A is a schematic exploded view of a lock including the part of FIGS. 2A to 2C.
Figure 3B:
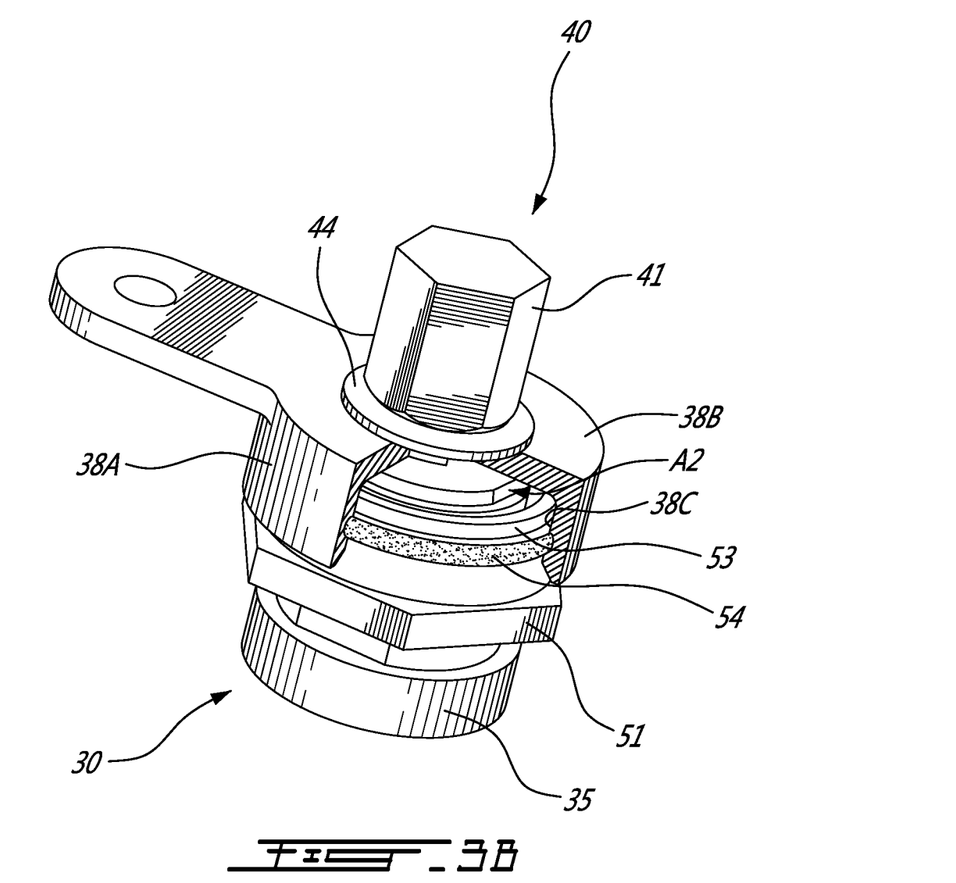
FIG. 3B is a schematic tridimensional assembled view of the lock of FIG. 3A.

Referring to FIGS. 3A and 3B, in order to obstruct the air leakage path A, the lock 30 has a cover 40. The cover 40 is removably or fixedly attached to the second end 32B of the core 31. When attached to the second end 32B of the core 31, the cover 40 blocks the keyhole 33 at the second end 32B and obstructs entry of air along the air leakage path A. By "obstructs", it is understood that the cover 40 blocks all of, or a substantial portion of, the air leakage path A to hinder or prevent the flow of air therealong. For example, in the depicted embodiment, the cover 40 blocks the entirety of the keyhole 33 at the second end 32B of the core 31, and thus blocks one of the sources of the air leakage path A. The blockage caused by the cover 40, even if not total, may be sufficient such that the pressure difference across the door 20 experienced during flight conditions is insufficient to drive air along the air leakage path A, or alternatively, results in a tolerable amount of air leakage along the air leakage path A.

FIGS. 3A and 3B show one possible embodiment of the cover 40. The cover 40 includes a cap 41 mounted onto the second end 32B of the core 31. The cap 41 is an elongated tubular body extending between a first cap end 42A and a second cap end 42B. The first cap end 42A engages the end wall 38B of the cap body 38, either directly or indirectly. The cap 41 has an inner opening 43 that extends into the cap 41. More particularly, the opening 43 extends into the cap 41 from the first cap end 42A. The cap 41 is closed at the second cap end 42B. Stated differently, the opening 43 does not extend all the way through the cap 41. A portion of the cap 41 at the second cap end 42B blocks the keyhole 33. Furthermore, the tubular body of the cap 41 encloses the open-ended slot which defines the keyhole 33, thereby providing at least partial sealing of the keyhole 33. The second end 32B of the core 31 is disposed in the opening 43 of the cap 41, and is enclosed by the cap 41 to obstruct the first source A1 of the air leakage path A. In the depicted embodiment, the cap 41 is a cap nut. The interior portion that defines the opening 43 has threads that are complementary to threads along the outer surface of the second end 32B of the core 31. The cap 41 can therefore be screwed onto the second end 32B. In the depicted embodiment, the cap 41 serves the dual-purpose of providing a sealing function and being the attachment hardware retaining the lock 30 together. Other techniques for mounting the cap 41 onto the second end 32B of the core 31 are within the scope of the present disclosure. In an alternate embodiment, the cover 40 includes a sealant to obstruct the first source A1 of the air leakage path A.

The cover 40 may be sufficient on its own to adequately obstruct the air leakage path A. Stated differently, the cover 40 may seal the first source A1 of the air leakage path A, and thus reduce air leakage across the lock 30 to an acceptable amount. However, if more airtightness is desired, additional components can be added to the lock 30 to improve the obstruction of the air leakage path A.

For example, and referring to FIGS. 3A and 3B, a seal member 50 can be provided to further seal the air leakage path A by obstructing the second source A2 thereof. FIG. 3B is partially sectioned to better show the components of the seal member 50. In the depicted embodiment, the seal member 50 includes a seal nut 51 mounted about the outer surface 34 of the outer shell 35. More particularly, the seal nut 51 is mounted in proximity to the first end 32A of the core 31, for example adjacent to a lock washer (not shown). In the depicted embodiment, the interior portion of the seal nut 51 that defines the central opening has threads that are complementary to threads along the outer surface 34 of the outer shell 35. The seal nut 51 can therefore be screwed onto the outer surface 34, providing the dual-purpose of both sealing functionality, and installation hardware to secure the lock 30 to the door 20. Other techniques for mounting the seal nut 51 onto the outer surface 34 are within the scope of the present disclosure.

The seal nut 51 is provided with a peripheral groove 53 in an outer surface of the seal nut 51. The groove 53 acts as a seat for a resilient body 54 disposed around the seal nut 51 in the groove 53. The resilient body 54 in the depicted embodiment is an O-ring. The cap body 38 is mounted about the outer surface of the seal nut 51 so that it engages the resilient body 54 to form the seal obstructing the second source A2 of the air leakage path A. More particularly, once the seal nut 51 is mounted onto the outer surface 34 of the outer shell 35, the cap body 38 is snuggly fitted over the seal nut 51 such that the inner surface 38C of the peripheral wall 38A engages the resilient body 54 in an interference fit. The resilient body 54 has an outer diameter that slightly exceeds the peripheral wall 38A inner diameter. Therefore, the resilient body 54 becomes slightly compressed providing a pneumatic sealing function. The size and material of the resilient body 54 can be designed to provide a low friction interface with the peripheral wall 38A to allow the cap body 38 to oscillate with the turning action of the lock with minimal added restriction. The seal nut 51, in combination with the cap body 38, therefore obstructs the second source A2 of the air leakage path A along the inner surface 38C of the peripheral wall 38A of the cap body 38, and complements the sealing functionality of the cover 40. The seal member 50 thus further contributes to improving the obstruction of the air leakage path A.

In order to further improve the obstruction of the first source A1 of the air leakage path A, a resilient washer 44 engages the cover 40. The resilient washer 44 is mounted about an outer surface of the core 31. The washer 44 in the depicted embodiment is made from nylon, but other materials are possible. The washer 44 is positioned between the end wall 38B of the cap body 38 and the first cap end 42A of the cap 41. In a particular embodiment, a lock washer (not shown) may be positioned between the washer 44 and the first cap end 42A of the cap 41, so as to help to prevent the cap 41 from loosening about the core 31. As the cap 41 is tightened about the second end 32B of the core 31, it increases the pressure of the cap 41 against the washer 44. The pressure applied by the cap 41 squeezes the washer 44 against the end wall 38B of the cap body 38, which improves the obstruction of the first source A1 of the air leakage path A by the cap 41. The washer 44 therefore adds to the sealing functionality of the cap 41, and thus further contributes to improving the obstruction of the air leakage path A. The functionality of washer 44 and the cap 41 could be accomplished using a single component. In an alternate embodiment, the cap 41 includes a compressible sealing feature incorporated into its mating surface at the first cap end 42A. This contributes to reducing the number of components of the lock 30.

It will therefore be appreciated that different components may be added to the lock 30 to improve its obstruction of the first and second sources A1, A2 of the air leakage path A. It will also be appreciated that other components of the lock 30 are possible and within the scope of the present disclosure which are capable of achieving the above-described functionality of the cover 40 and seal member 50.

Figure 4A:
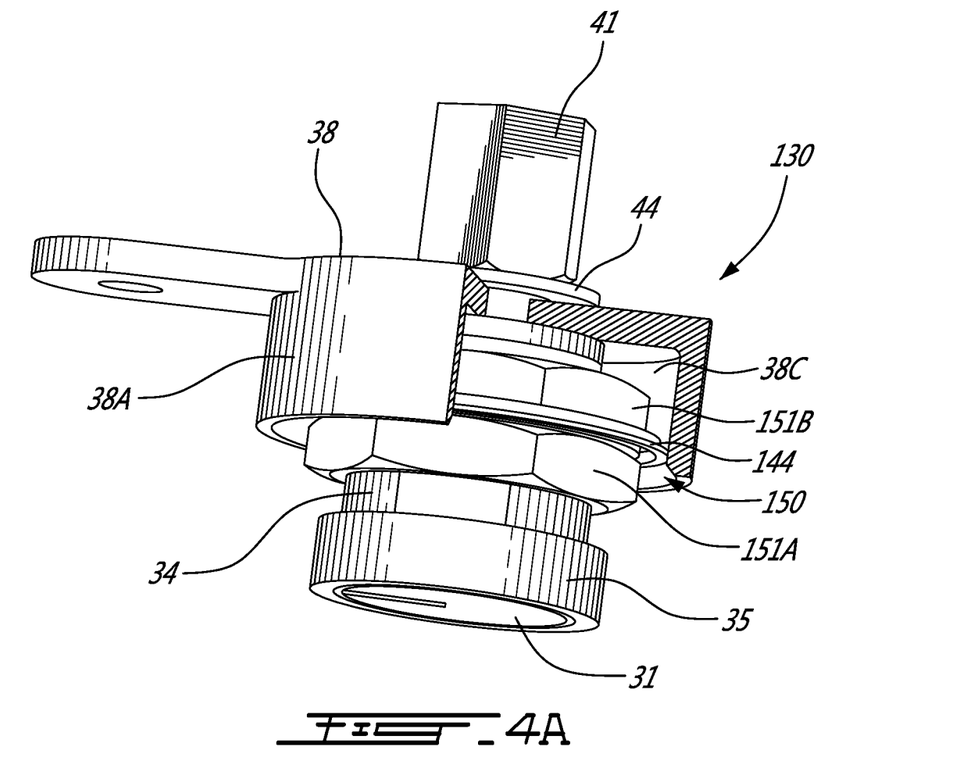
FIG. 4A is a schematic tridimensional assembled view of a lock including the part of FIGS. 2A to 2C, according to another embodiment of the disclosure.
Figure 4B:
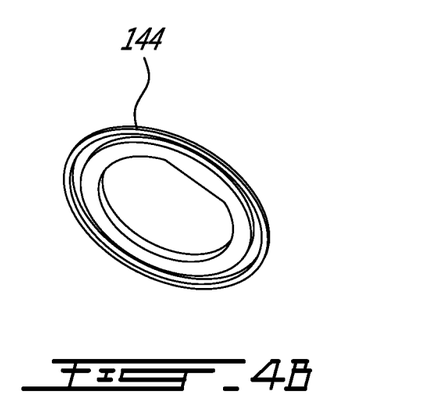
FIG. 4B is a schematic tridimensional view of a seal washer of the lock of FIG. 4A.

Another embodiment of the lock 130 is shown in FIG. 4A, where elements similar to the lock 30 are identified by the same reference numbers and will not be further described herein. The lock 130 in FIG. 4A is partially sectioned to better show some of the components of the lock 130. In this embodiment, the seal member 150 includes a resilient seal washer 144 (see FIG. 4B) mounted about the outer surface 34 of the outer shell 35. The seal washer 144 in the depicted embodiment is a diaphragm washer. In a particular embodiment, the seal washer 144 is made from polyurethane, but other materials are possible. The seal member 150 also includes two nuts 151A,151B mounted about the outer surface 34 of the outer shell 35 on opposed sides of the seal washer 144. The nuts 151A,151B are jam nuts. The nuts 151A,151B engage the seal washer 144 to form the seal obstructing the second source A2 of the air leakage path A. The peripheral wall 38A of the cap body 38 is mounted about the nuts 151A,151B and the seal washer 144 such that the inner surface 38C of the peripheral wall 38A abuts against the seal washer 144 with a close tolerance clearance fit configuration, allowing the cap body 38 to be oscillated freely with the rotating lock action without significant resistance. The seal washer 144 is shaped such that the pressure differential across the seal washer 144 will cause it to slightly deform and press with more force against the inner surface 38C of the peripheral wall 38A, helping to provide the sealing function only when required. The seal washer 144, in combination with the cap body 38, therefore obstructs the second source A2 of the air leakage path A along the inner surface 38C of the peripheral wall 38A of the cap body 38.

Referring to FIGS. 3A and 3B, there is also disclosed a method of reducing air leakage through the lock 30 disposed between the first and second zones 11,12. The method also includes providing the lock 30 with the outer shell 35 and the inner rotatable core 31 with the keyhole 33. The keyhole 33 is in fluid communication with the first and second zones 11,12. Air travels along the air leakage path A defined by the keyhole 33 because of the difference in pressure between the first and second zones 11,12. The method also includes blocking the keyhole 33 at the second end 32A of the core 31 within one of the first and second zones 11,12 to obstruct the air leakage path A. The method may be applied to repair, replace, or retrofit an existing lock. In such an embodiment, at least some of the components of the lock 30 disclosed herein are used to modify an existing lock to reduce pressure leaks, for example.

In a particular embodiment, the seal member 50, 150, the cam 36 and the cover 40 may be provided as a kit for retrofitting an existing lock having an undesirable level of air leakage, such as for example the lock 300 of FIGS. 5A-5B. The seal member 50, 150 is sized and configured so as to be sealingly engageable around the outer shell of the existing lock. The seal member 50, 150 may also be used to replace the existing jam nut 308 used to secure the lock 300 onto the door 301 (see FIG. 5A). The cam 36 is provided as a replacement cam substitutable with the existing cam 305 of the lock; the mounting slot 38D of the cap body 38 is sized and configured for engaging the core of the lock, and the cap body 38 is sealingly engageable with the seal member 50, 150 when received around the outer shell. The cover 40 is sealingly engageable with an end of the core protruding from the cam 36 to block the keyhole 303 and obstruct the air leakage path 302 defined through the keyhole. The cover may also be used to replace the nut 307 used to secure the lock 300 together (see FIG. 5A).

Accordingly, in a particular embodiment, a lock such as the lock 300 shown in FIGS. 5A-5B is retrofitted by disconnecting its cam 305 from its core and removing the cam 305. The jam nut 308 and nut 307 may also be removed. The seal member 50, 150 is sealingly engaged around the outer shell in a manner similar to that shown for the outer shell 35 of FIGS. 3A, 3B, 4A, 4B. The replacement cam 34 is connected with the core of the lock by inserting the core through the mounting slot 38D of the cap body 38. Part of the outer shell is surrounded with the cap body 38 and the cap body 38 is sealingly engaged with the seal member 50, 150. The cover 40 is sealingly engaged with the end of the core protruding from the replacement cam 34 to block the keyhole at the end and obstruct the air leakage path defined through the keyhole.

In light of the preceding, it is appreciated that the lock 30,130 disclosed herein reduces or eliminates pressure leakage across the lock 30,130 when the lock 30,130 is part of door within a pressurized environment. In a particular embodiment, the reduction or elimination of air leakage may help to reduce the acoustic impact of the lock 30,130, may help to increase the service life of the lock 30,130, may increase performance and reduce strain on an aircraft's environmental pressurization systems, and may be complimentary to the use of a standard lock and key system across an entire aircraft. The lock 30,130 also contributes to weight savings by eliminating the need for a pressure box used to achieve the same functionality.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A lock for an aircraft door, the lock comprising:
an outer shell having an inner cavity;
a core rotatably mounted within the inner cavity to rotate about an axis of the core, the core having a keyhole extending through the core from a first end of the core for receiving a key therein, to an opposed second end of the core, the keyhole defining an air leakage path through the core, the keyhole forming an opening having a shape being complimentary to that of the key insertable into the keyhole;
a cam having a cam arm mounted about the core and rotatable therewith, the second end of the core protruding from the cam; and
a cover attached to the second end of the core, the cover blocking the keyhole at the second end of the core and obstructing the air leakage path.

2. The lock as defined in claim 1, wherein the cover includes a cap having a tubular body extending between a first open end and a second closed end, the second end of the core being disposed in the cap and the tubular body encasing the keyhole to obstruct the air leakage path.

3. The lock as defined in claim 1, further comprising a washer mounted about the outer surface of the core between the cam and the cover, the washer abutting the cam.

4. The lock as defined in claim 1, wherein the cam includes a cap body, the arm extending from the cap body, the cap body having a mounting slot and surrounding an axial portion of an outer surface of the outer shell, the core extending through the mounting slot to mount the cap body to the core.

5. The lock as defined in claim 4, further comprising a seal nut mounted about the outer surface of the outer shell, the seal nut having a peripheral groove in an outer surface thereof and a resilient body disposed in the groove, the cap body being mounted about the seal nut, a peripheral wall of the cap body sealingly engaging the resilient body.

6. The lock as defined in claim 4, further comprising a resilient seal washer mounted about the outer surface of the outer shell, and two nuts mounted about the outer surface of the outer shell on opposite sides of the seal washer and engaging the seal washer, the seal washer sealingly engaging the outer surface of the outer shell and the cap body.

7. An aircraft door, comprising:
a door body having a lock hole; and
a lock, comprising:
an outer shell having an inner cavity, the outer shell mounted within the lock hole;
a core rotatably mounted within the inner cavity to rotate about an axis of the core, the core having a keyhole extending through the core from a first end of the core for receiving a key therein, to an opposed second end of the core, the keyhole defining an air leakage path through the core, the keyhole forming an opening having a shape being complimentary to that of the key insertable into the keyhole;
a cam having a cam arm mounted about the core and rotatable therewith, the second end of the core protruding from the cam; and
a cover attached to the second end of the core, the cover blocking the keyhole at the second end of the core and obstructing the air leakage path.

8. The aircraft door as defined in claim 7, wherein the cover includes a cap having a tubular body extending between a first open end and a second closed end, the second end of the core being disposed in the cap and the tubular body encasing the keyhole to obstruct the air leakage path.

9. The aircraft door as defined in claim 7, further comprising a washer mounted about the outer surface of the core between the cam and the cover, the washer abutting the cam.

10. The aircraft door as defined in claim 7, wherein the cam includes a cap body, the cam arm extending from the cap body, the cap body having a mounting slot and surrounding an axial portion of an outer surface of the outer shell, the core extending through the mounting slot to mount the cap body to the core.

11. The aircraft door as defined in claim 10, further comprising a seal nut mounted about the outer surface of the outer shell, the seal nut having a peripheral groove in an outer surface thereof and a resilient body disposed in the groove, the cap body being mounted about the seal nut, a peripheral wall of the cap body sealingly engaging the resilient body.

12. The aircraft door as defined in claim 10, further comprising a resilient seal washer mounted about the outer surface of the outer shell, and two nuts mounted about the outer surface of the outer shell on opposite sides of the seal washer and engaging the seal washer, the seal washer sealingly engaging the outer surface of the outer shell and the cap body.

13. An aircraft, comprising: a wall defining a first zone on a first side of the wall and a second zone on a second side of the wall, the first zone configured to have a first pressure and the second zone configured to have a second pressure different from the first pressure, and the aircraft door as defined in claim 7, the aircraft door disposed in the wall and openable to provide access between the first and second zones.

14. A method of reducing air leakage through a lock for an aircraft door disposed between a first zone having a first pressure and a second zone having a second pressure different than the first pressure, the method comprising:
providing the lock with an outer shell having a rotatable core therein, the core having a keyhole extending through the core from a first end of the core for receiving a key therein, to an opposed second end of the core, the keyhole being in fluid communication with the first and second zones, an air leakage path defined along the keyhole, the keyhole forming an opening having a shape being complimentary to that of the key insertable into the keyhole; and
blocking the keyhole at the second end of the core to obstruct the air leakage path.

15. The method as defined in claim 14, wherein blocking the keyhole includes enclosing the second end of the core.

16. The method as defined in claim 14, further comprising sealingly engaging a cam to an outer surface of the outer shell.

17. The method as defined in claim 16, wherein sealingly engaging the cam includes obstructing a radial distance defined between the cam and the outer surface of the outer shell.

18. The method as defined in claim 14, wherein providing the lock includes replacing an arm of a cam of the lock.

19. A method of retrofitting a lock for an aircraft door disposed between a first zone having a first pressure and a second zone having a second pressure different than the first pressure, the lock including an outer shell, a core rotatable within the outer shell and having a keyhole slot extending therethrough, and a cam extending from and connected to the core, the method comprising:
disconnecting the cam from the core and removing the cam;
sealingly engaging a seal member around the outer shell;
connecting a replacement cam with the core by inserting the core through a mounting slot of a cap body;
surrounding part of the outer shell with the cap body and sealingly engaging the cap body with the seal member; and
engaging a cover with an end of the core protruding from the replacement cam to block the keyhole at the end and obstruct an air leakage path defined through the keyhole, the keyhole forming an opening having a shape being complimentary to that of a key insertable into the keyhole.

20. A retrofit kit for reducing air leakage through a lock for an aircraft door, the lock including an outer shell, a core rotatable within the outer shell and having a keyhole slot extending therethrough, and a cam extending from and connected to the core, the kit comprising:
a seal member sealingly engageable around the outer shell;
a replacement cam including a cap body having a mounting slot defined therethrough for engaging the core, the cap body sealingly engageable with the seal member, the replacement cam substitutable with the cam;
a cover sealingly engageable with an end of the core protruding from the cam to block the keyhole at the end and obstruct an air leakage path defined through the keyhole, the keyhole forming an opening having a shape being complimentary to that of a key insertable into the keyhole.

* * * * *